United States Patent [19]

Li

[11] Patent Number: 4,568,735

[45] Date of Patent: Feb. 4, 1986

[54] PROCESS FOR PREPARING POLYEPOXIDES (II)

[75] Inventor: Simon M. K. Li, Houston, Tex.

[73] Assignee: Shell Oil Company, Houston, Tex.

[21] Appl. No.: 743,272

[22] Filed: Jun. 11, 1985

Related U.S. Application Data

[63] Continuation of Ser. No. 668,529, Nov. 5, 1984, abandoned.

[51] Int. Cl.$^4$ .............................................. C08G 59/02
[52] U.S. Cl. ...................................... 528/89; 528/88; 528/90; 528/93; 528/104
[58] Field of Search ........................ 528/88, 89, 90, 93, 528/104

[56] References Cited

U.S. PATENT DOCUMENTS

| | | | |
|---|---|---|---|
| 3,477,990 | 11/1969 | Dante et al. | 260/47 |
| 3,547,881 | 12/1970 | Mueller et al. | 260/47 |
| 3,824,212 | 7/1974 | Sinnema et al. | 260/47 EP |
| 3,843,605 | 10/1974 | Schmidt et al. | 260/47 |
| 3,948,855 | 4/1976 | Perry | 260/47 |
| 3,978,027 | 8/1976 | Marshall | 260/47 |
| 4,105,634 | 8/1978 | Hanson | 526/65 |
| 4,320,222 | 3/1982 | Lopez | 528/89 |
| 4,438,254 | 3/1984 | Doorakian et al. | 528/89 |

Primary Examiner—Earl Nielsen

[57] ABSTRACT

A process for preparing polyepoxides having a wide molecular weight distribution comprises reacting a liquid polyepoxide and polyhydric phenol in a first step, and reacting the resulting intermediate with additional polyhydric phenol and polyepoxide in one or more additional steps.

8 Claims, No Drawings

PROCESS FOR PREPARING POLYEPOXIDES (II)

This is a continuation of application Ser. No. 668,529, filed Nov. 5, 1984, now abandoned.

FIELD OF THE INVENTION

This invention relates to a process for reacting a phenol with an epoxy-containing compound and to the resulting products. More particularly, the invention relate to a process for effecting a specific reaction between compounds possessing a vic-epoxy group and a phenolic hydroxyl group, and to the products obtained thereby.

BACKGROUND OF THE INVENTION

Epoxy compounds are well known and include many compounds of varying molecular weight and epoxy equivalent weight. To simplify the production of a large number of epoxy compounds that vary mainly in molecular weight, it is common practice to manufacture a single epoxy compound of specified molecular weight and react the epoxy compound with a compound containing phenolic hydroxyl groups in the presence of catalyst so as to obtain epoxides of phenolic hydroxy ether compounds of desired higher molecular weight. The conventional catalysts employed were inorganic bases or tertiary amines which were also effective catalysts for competing reactions of epoxides with alcoholic hydroxyl groups, homopolymerization of epoxy groups and the like. As a result, the product obtained was a mixture of polymers and resins with varying degrees of molecular weight, chain branching and end group functionality. Such a composition detracts from the performance and utility of the product. More recent catalysts (termed "fusion catalysts") with improved selectivity include phosphonium halides as disclosed in U.S. Pat. No. 3,477,990, phosphines as disclosed in U.S. Pat. No. 3,547,881, and, 3-(trihydrocarbylphosphoranylidene)-2,5-pyrrolidinediones as disclosed in U.S. Pat. No. 3,843,605. Other fusion catalysts are disclosed in U.S. Pat. No. 3,948,855 (phosphonium salt of an acid, acid ester or ester of carbon or phosphorous) and U.S. Pat. No. 3,978,027 (potassium iodide). Processes involving multiple addition of catalyst to give higher molecular weight polyepoxides with narrower molecular weight distributions are disclosed in U.S. Pat. No. 4,105,634.

SUMMARY OF THE INVENTION

The present invention relates to a process for producing polyepoxide resins having a relatively wide molecular weight distribution for a given epoxide equivalent weight. In particular, the present invention is directed to a process which comprises:

(a) reacting a polyepoxide having more than one 1,2-epoxide group with a polyhydric phenol in a first step in the presence of an effective amount of a fusion catalyst to form an intermediate product; and (b) reacting said intermediate product with additional amounts of polyhydric phenol and polyepoxide and effective amounts of fusion catalysts in one or more additional steps where (i) the amount of polyhydric phenol used in each of the steps is about 10 to 90 percent by weight of the total amount of polyhydric phenol used;

(ii) the amount of polyepoxide used in each of the steps is about 10 to 90 percent by weight of the total amount of polyepoxide used; and (iii) the weight ratio of said polyhydric phenol to said polyepoxide employed in each step is about 0.3 to about 0.6.

As shown in the examples which follow, it was found unexpectedly that the resulting product polyepoxide by using more than one stage of polyhydric phenol/polyepoxide addition possesses not only wider molecular weight distribution, but also a relatively higher content of the monomeric diepoxide as compared to that produced in a single reaction step using the same ratio of starting reactants, i.e., the techniques described in the present invention allow one to produce relatively more of the "tail-end" high molecular weight components, as well as more of the very low molecular weight components (e.g. the monomeric diepoxide such as the diglycidyl ether of bisphenol A, DGEBA) in the product.

The ability to control the molecular weight distribution at a given product epoxide content is significant, and this provides avenues for one to "tailor" products according to specific needs and applications. For example, in the case of curing the polyepoxide through the use of an amine (see later section on "Curing of the epoxy containing, phenolic hydroxy ether compounds) and products made via the present invention (containing more of the monomeric diepoxide) could result in a cured product which can be characterized as possessing a "tighter" network and tougher properties. Furthermore, the present invention can best be utilized in the continuous production of such desired product, thus (1) eliminating the burden of stages additions in a fixed batch vessel; and (2) allowing for a better control of heat release, since large amounts of heat liberation is typical for these "polycondensation" reactions, and it is more difficult to manage the heat release under the one-stage reaction conditions.

DETAILED DESCRIPTION OF THE INVENTION

The process of the invention involves the reaction of an epoxy compound and a phenol in the presence of a fusion catalyst to form the desired phenolic hydroxy ether of the partial formula

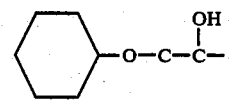

A key aspect of the present invention is the order in which the epoxy compound, phenol and catalyst are brought together.

The Polyepoxides

The liquid polyepoxides employed in the present invention include those compounds possessing more than one vic-epoxy group per molecule, i.e. more than one

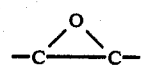

group per molecule. These polyepoxides are saturated or unsaturated, aliphatic, cycloaliphatic, aromatic or heterocyclic, and are substituted, if desired, with non-interfering substituents, such as halogen atoms, hydroxy groups, ether radicals, and the like. Polyepoxides employed are monomeric or polymeric. Preferred liquid polyepoxides include the so-called liquid glycidyl polyethers of polyhydric phenols and polyhydric alcohols. More preferred are the glycidyl polyethers of 2,2-bis(4-hydroxyphenyl)propane having an average molecular weight between about 300 and about 900 and an epoxide equivalent weight of between about 170 and about 500. Especially preferred are the glycidyl polyethers of 2,2-bis(4-hydroxyphenyl)propane having an average molecular weight of between about 300 and about 900, an epoxide equivalent weight of between about 170 and about 500, and containing from about 0.01% to about 1.0% weight or higher saponifiable chlorine. As used herein the terms "epoxide equivalent weight" and "weight per epoxide" refer to the average molecular weight of the polyepoxide molecule divided by the average number of oxirane groups present in the molecule.

Various examples of polyepoxides that may be used in this invention are given in U.S. Pat. No. 3,477,990 (e.g., column 2, line 39 to column 4, line 75) and it is to be understood that so much of the disclosure of that patent relative to examples of polyepoxides is incorporated by reference into this specification.

The Phenols

The phenols used in the process of the invention are those compounds possessing at least one hydroxyl group attached to an aromatic nucleus. The phenols are monohydric or polyhydric and are substituted, if desired, with a great variety of different types of substituents. Examples of the phenols include among others, phenol, resorcinol, o-cresol, m-cresol, p-cresol, chlorophenol, nitrophenol, hydroquinone, 2,2-bis(4-hydroxyphenyl)propane, 2,2-bis(4-hydroxyphenyl)pentane, and the like, and polymeric type polyhydric phenols obtained by condensing monohydric or polyhydric phenols with formaldehyde.

Preferred phenols to be used are the polyhydric phenols containing from 2 to 6 OH groups and up to 30 carbon atoms. Coming under special consideration are the phenols of the formula

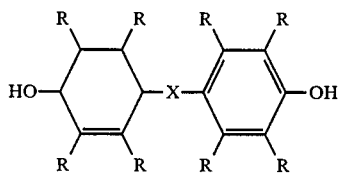

wherein X is a polyvalent element or radical and R independently is a member of the group consisting of hydrogen, halogen and hydrocarbon radicals. The preferred elements or radicals represented by X are oxygen, sulfer, —SO—, —SO$_2$—, divalent hydrocarbon radicals containing up to 10 carbon atoms and oxygen, silicon, sulfur or nitrogen containing hydrocarbon radicals, such as —OR'O—, —OR'OR'O—, —S—R'—S—, —S—R'—S—R'—S, —OSiO—, —OSiOSiO—,

—SO$_2$—R'—SO$_2$— radicals where R' is a divalent hydrocarbon radical.

Various examples of phenols that may be used in this invention are also given in U.S. Pat. No. 3,477,990, (e.g. column 5, line 1 to column 6, line 10) and it is to be understood that so much of the disclosure of that patent relative to examples of phenols is incorporated by reference into this specification.

The various fusion catalysts employed in this invention include those catalysts described in the Background of the Invention along with the onium salt catalysts described in U.S. Pat. No. 3,377,406 (at column 4, lines 7-46, which portion is herein incorporated by reference). Preferred are the phosphonium, sulfonium and ammonium salts of inorganic acids. Especially preferred are phosphonium halides, i.e., phosphonium iodides such as ethyl triphenylphosphonium iodide (ETPPI).

Preparation of the Phenolic Hydroxy Ether Compounds

The amount of the epoxide and the phenol, along with the approximate stages of additional amounts of phenol and epoxide are important considerations.

The amount of the epoxide and the phenol to be employed in the process steps varies over a wide range depending upon the type of reactants and the type of product to be produced. For example, if one is reacting a diepoxide with a monohydric phenol and both epoxy groups are to be reacted, one mole of diepoxide should be reacted with about two moles of the monohydric phenol. If a polymeric product is desired smaller ratios should be utilized as desired, such as, for example, 5 moles of the diepoxide and 2 moles of the polyhydric phenols.

Superior results are obtained when the higher molecular weight resins are produced and in this case the ratios of reactants are varied depending upon the molecular weight desired and upon the type of end groups, i.e., whether the product is to be terminated with an epoxide or with a phenol.

An especially preferred use of the present invention is in the preparation of a phenolic hydroxy ether resin having an epoxide equivalent weight of between about 300 and about 5000 wherein the resin is prepared by reacting 2,2-bis(4-hydroxyphenyl)propane with the diglycidyl ether of 2,2-bis(4-hydroxyphenyl)propane having a saponifiable chlorine content of between about 0.01% and about 1.0% weight.

The amount of the catalyst employed varies widely. Effective amounts are used. In general, the amount of catalyst varies from about 0.001% to about 1% by weight, of the total reactants, more preferably from about 0.002% to about 0.2% and most preferably from about 0.03% to about 0.1% by weight of the reactants.

The reaction is conducted in the presence or absence of solvents or diluents. In most cases, the reactants are liquid and the reaction is easily effected without the addition of solvents or diluents. However, in some cases, where either or both reactants are solids or viscous liquids it is desirable to add diluents to assist in effecting the reaction. Examples of such materials include methyl ethyl ketone (MEK) as used in the production of EPONOL ® Resins.

If solvents are employed in the reaction and the resulting product is to be used for coating purposes, the solvent is typically retained in the reaction mixture.

Otherwise, the solvent is removed by any suitable method such as by distillation or the like.

When it is desired to produce phenolic hydroxy ethers of higher viscosities but not higher epoxide equivalent weights, the polyepoxide and phenol are subjected to thermal bodying prior to the addition of the catalyst. "Thermal bodying" refers to heating the polyepoxide-phenol mixture at specified temperatures and times prior to adding the catalyst. A preferred thermal bodying treatment comprises heating the polyepoxide-phenol mixture to a temperature of between about 250° F. and 400° F., preferably between about 300° F. and about 325° F., for between about 15 minutes and 60 minutes.

The key aspect of the present invention is the staged addition of polyepoxide, phenol and fusion catalyst. Generally, it can be said that the greater the number of stages employed, the higher the relative content of the low molecular weight components and the wider the molecular weight distribution. More specifically, a suitable number of staged additions is between 2 to 10 stages, preferably between 3 and 7 stages. The amounts of the phenol and polyepoxide to be added in the multiple stages can vary also, and are dependent on the product epoxide content and how many stages are actually employed. More specifically, the amount of phenol to be added in any given stage can vary from 10% to 90% of the total phenol, preferably 10% to 60%. The suitable amount of polyepoxide to be added in any given stage can vary from 10% to 90%w of the total polyepoxide used, preferably 10% to 60%w. The weight ratio of phenol to polyepoxide is about 0.3 to about 0.6. It goes without saying that the individual amounts of phenol and polyepoxide added in the multiple stages should add up to yield a ratio of phenol to polyepoxide designed for the particular product. It may also be desirable to change the relative ratio of phenol and polyepoxide added in each stage.

The products obtained by the above process are the desired phenolic hydroxy ether compounds. Their physical characteristics depend upon the desired reactants and proportions. In general, the products vary from liquids to solids, and in the case of the high molecular weight resins vary from viscous liquids to hard solids. The products possess at least one alcoholic hydroxyl group formed by each reaction of the epoxide and phenolic hydroxyl group, and can be further reacted through this group or groups. The polyfunctional reactants also give products terminated in phenolic hydroxyl groups and/or epoxy groups, and these are available for further reaction.

A group of products which are particularly outstanding are those resins and polymers obtained by the reaction of the polyepoxides and polyhydric phenols in controlled proportions. Those which use an excess of the polyepoxide are terminated in epoxy groups and can be used as polyepoxides in known reactions of polyepoxides and curing agents and the like. These high molecular weight polyepoxides are particularly useful in preparing surface coatings, adhesives, laminates, filament windings, coatings for highways and airfields, structural applications, formation of foams and the like. Those prepared from the halogenated polyhydric phenols are particularly useful as flame proofing resins for forming laminates, coatings and the like.

Curing of the Epoxy Containing, Phenolic Hydroxy Ether Compounds

The epoxy-containing, phenolic hydroxy ether compounds obtained by use of the present invention are reacted with various conventional curing agents to form hard insoluble, infusible products. Examples of suitable curing agents include, among others, the polybasic acids and their ahydrides such as the di, tri- and higher carboxylic acids; those acids containing sulfur, nitrogen, phosphorus or halogens; amino-containing compounds such as, for example, diethylene triamine and pyridine; polyamides containing active amino and-/or carboxyl groups; and others.

The amount of curing agent varies considerably depending upon the particular agent employed. For the alkalies or phenoxides, 1% to 4% by weight is generally suitable. With phosphoric acid and esters thereof, good results are obtained with 1 to 10% by weight added. The tertiary amine compounds are preferably used in amounts of about 1% to 15% by weight. The acids, anhydrides, polyamides, polyamines, polymercaptans, etc. are preferably used in at least 0.8 equivalent amounts, and preferably 0.8 to 1.5 equivalent amounts. An equivalent amount refers to that amount needed to give one active hydride (or anhydride group) per epoxy group.

Solvents or diluents are sometimes added to make the composition more fluid or sprayable. Preferred solvents or diluents include those which are volatile and escape from the polyepoxide composition before or during cure such as esters, chlorinated hydrocarbons and the like. To minimize expense, these active solvents are often used in admixture with aromatic hydrocarbons such as benzene, toluene, xylene, etc. and/or alcohols such as ethyl, isopropyl or n-butyl alcohol. Solvents which remain in the cured compositions are used, such as diethyl phthalate, dibutyl phthalate and the like, as well as cyano-substituted hydrocarbons, such as acetonitrile, propionitrile, adiponitrile, benzonitrile, and the like. It is also convenient to employ normally liquid glycidyl compounds, glycidyl cyclopentyl ether, diglycidyl ether, glycidyl ether of glycerol and the like, and mixtures thereof.

Other materials are also added to the composition as desired. This includes other types of polyepoxides such as described in U.S. Pat. No. 3,477,990. This also includes fillers, such as sand, rock, resin particles, graphite, asbestos, glass or metal oxide fibers, and the like, plasticizers, stabilizers, asphalts, tars, resins, insecticides, fungicides, anti-oxidants, pigments, stains and the like.

The temperature employed in the cure varies depending chiefly on the type of curing agent. The amino-containing curing agents generally cure at or near ambient temperature and no heat needs to be applied. The acids, anhydrides, and melamine derivatives, on the other hand, generally require heat, such as temperatures ranging from about 150° F. to about 400° F. Preferred temperatures range from about 200° F. to about 400° F. and more preferably from about 250° F. to 380° F.

The compositions containing the polyepoxides and curing agents are used for a variety of important applications. They are used, for example, as adhesives for metal, wood, concrete, plaster and the like, and as surface coatings for various types of surfaces. The new compositions are also used in the preparation of laminates or resinous particles reinforced with fibrous textiles. They are also used in the formation of castings and molding and for the encapsulation of electrical equipment.

The invention is further illustrated by means of the following examples. Note that the examples are given for the purpose of illustration only and that the invention is not to be regarded as limited to any of the specific conditions or reactants noted therein.

As used below, "WPE" refers to weight per epoxide and "viscosity" refers to Ubbelohde viscosity (ASTM #D-444-74).

EXAMPLE 1

Normal Run (for comparison only)

421.2 g of polycarbonate-grade BPA and 1378.8 g of EPON® 828LS (low saponifiable chlorine grade epoxy resin) were mixed and heated to form a homogeneous solution at 223° F. in a 2-liter heat-traced resin kettle equipped with a stirrer, a condenser, a thermocouple and a nitrogen sparge line. The mixture was de-aerated with nitrogen sparge throughout the experiment.

1.09 gm of ethyl triphenyl phosphonium iodid (ETPPI) was added to this mixture and the system temperature was allowed to rise to 355° F. and maintained to ±5° F. for one hour the product was dumped onto a pan to cool and solidify. The product was a WPE of 501. The 40%w solids in methyl ethyl ketone solution has a Ubbelohde viscosity of 7.19 cp.

EXAMPLE 2

Double-Premix Addition Run

In a separate run, 420 g of the product from Example 1 was melted and deaerated with nitrogen in a 1-liter heat-traced resin kettle equipped with a stirrer, a condenser, a thermocouple, and a nitrogen sparge line. 174.4 g of a hot (210° F.) homogeneous mixture of EPON® Resin 828LS (76.6%w) and polycarbonate grade BPA (23.4%w) was then charged into this melt, followed by addition of 0.34 g of ETPPI. The system temperature was allowed to rise to 350° F. and maintained to ±5° F. for one hour before the product was dumped into a pan to cool and solidify. The final product has a WPE of 528. The 40%w solids in methyl ethyl ketone solution has a Ubbelohde viscosity of 9.14 cp.

EXAMPLE 3

Normal Run (for comparison only)

358.8 g polycarbonate-grade BPA and 841.2 g of EPON Resin 828LS were mixed and heated to form a homogeneous solution at 230° F. in a 2-liter heat-traced resin kettle equipped with a stirrer, a condenser, a thermocouple and nitrogen sparge line. The mixture was deaerated with nitrogen sparge throughout the experiment.

0.75 g of ETPPI was added to this mixture and the system temperature was allowed to rise to 350° F. and maintained to ±5° F. for one hour. Sample product (33.5 g) was taken and has a WPE of 948. The 40%w solids in methyl ethyl ketone solution has a Ubbelohde viscosity of 23.8 cp.

EXAMPLE 4

Double-Premix Addition Run

To the remaining product in the kettle in Example 3 was charged 309.2 g of a hot, homogeneous mixture of EPON Resin 828LS (70.1%w) and polycarbonate-grade BPA (29.9%w), followed by addition of 0.92 g of ETPPI. The system was allowed to rise to 356° F. and maintained to ±5° F. for one hour before the product is dumped onto a pan to cool and solidity. The final product has a WPE of 963. The 40%w solids in methyl ethyl ketone solution has a Ubbelohde viscosity of 33.2 cp.

The HPLC (high performance liquid chromatography) results are summarized in the accompanying table.

| | SUMMARY OF THE RELATIVE OLIGOMERS WEIGHT RATIOS USING HPLC | | | |
|---|---|---|---|---|
| | Relative Oligomer Weight Ratios[2] | | | |
| Oligomer Number, n[1] | Ex. 1 - Normal | Ex. 2 - Double Premix | Ex. 3 - Normal | Ex. 4 - Double Premix |
| 0 | 1 | 1 | 1 | 1 |
| 1 | 0.190 | 0.101 | 0.218 | 0.184 |
| 2 | 1.134 | 0.830 | 1.461 | 0.843 |
| 3 | 0.298 | 0.212 | 0.444 | 0.242 |
| 4 | 0.998 | 0.762 | 1.856 | 0.964 |
| 5 | 0.299 | 0.217 | 0.732 | 0.531 |
| 6 | 0.621 | 0.578 | 1.883 | 0.768 |
| 7 | 0.200 | 0.179 | 0.351 | 0.197 |
| 8 | 0.286 | 0.319 | 0.681 | 0.455 |
| 9 | 0.057 | 0.134 | — | — |

[1]The oligomer has the structure:

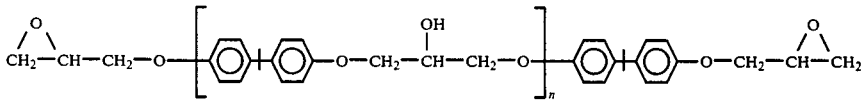

where n = 0,1,2 ...

[2]The area (weight content) integrated by HPLC for n = 0 oligomers is taken to be unity. The weight contents of other oligomers are expressed as relative to that of n = 0.

What is claimed is:

1. A process for producing polyepoxide resins having a relatively wide molecular weight distribution per epoxide equivalent weight, which process comprises:
   (a) reacting a polyepoxide having more than one 1,2-epoxide group with a polyhydric phenol in a first step in the presence of an effective amount of a fusion catalyst to form an intermediate product; and
   (b) reacting said intermediate product with additional amounts of polyhydric phenol, polyepoxide and effective amounts of fusion catalyst in one or more additional steps where (i) the amount of polyhydric phenol used in each of the steps is about 10 to about 90 percent by weight of the total amount of polyhydric phenol used;
(ii) the amount of polyepoxide used in each of the steps is about 10 to 90 percent by weight of the total amount of polyepoxide used; and
(iii) the weight ratio of said polyhydric phenol to said polyepoxide employed in each step is about 0.3 to about 0.6.

2. The process according to claim 1 wherein said polyepoxide having more than one 1,2-epoxide group is a liquid glycidyl polyether of a polyhydric phenol.

3. The process according to claim 2 wherein said polyhydric phenol is 2,2-bis(4-hydroxyphenyl)propane.

4. The process according to claim 1 wherein said polyhydric phenol is 2,2-bis(4-hydroxyphenyl)propane.

5. The process according to claim 1 wherein said fusion catalyst is a phosphonium halide.

6. The process according to claim 1 wherein the number of steps employed in part (b) is one to nine steps.

7. The process according to claim 6 where the amounts of polyhydric phenol and polyepoxide used in each step are about 10 to about 60 percent by weight of the respective total amount of polyhydric phenol and polyepoxide used.

8. The process according to claim 1 where the weight ratio of phenol to polyepoxide is different in each step.

* * * * *